United States Patent
Madsen

(10) Patent No.: US 9,561,737 B2
(45) Date of Patent: Feb. 7, 2017

(54) MOBILE ALUMINUM-AIR BATTERY POWER SYSTEM

(71) Applicant: ELECTRO-MOTIVE DIESEL, INC., LaGrange, IL (US)

(72) Inventor: John Ernst Nielsen Madsen, Lemont, IL (US)

(73) Assignee: Electro-Motive Diesel, Inc., La Grange, IL (US)

(*) Notice: Subject to any disclaimer, the term of this patent is extended or adjusted under 35 U.S.C. 154(b) by 239 days.

(21) Appl. No.: 14/318,151

(22) Filed: Jun. 27, 2014

(65) Prior Publication Data
US 2015/0375636 A1  Dec. 31, 2015

(51) Int. Cl.
*H01M 2/40* (2006.01)
*H01M 12/06* (2006.01)
(Continued)

(52) U.S. Cl.
CPC ........... *B60L 11/1883* (2013.01); *H01M 2/40* (2013.01); *H01M 12/06* (2013.01); *H01M 12/08* (2013.01);
(Continued)

(58) Field of Classification Search
CPC ........ H01M 2/40; H01M 12/06; H01M 12/08; H01M 4/463; H01M 2220/20; H01M 2250/20; B60L 11/1883
See application file for complete search history.

(56) References Cited

U.S. PATENT DOCUMENTS 4,477,539 A * 10/1984 Struthers ................ H01M 2/40
429/402
4,925,744 A   5/1990 Niksa et al.
(Continued)

FOREIGN PATENT DOCUMENTS

WO   WO 2013/150521 A1   10/2013

OTHER PUBLICATIONS

Yang, Shaohua and Knickle, Harold, "Design and Analysis of Aluminum/Air Battery System for Electric Vehicles," *Journal of Power Sources*, 112, (2002), 162-173, Published Jun. 14, 2002, 12 pages.
(Continued)

*Primary Examiner* — Gregg Cantelmo
(74) *Attorney, Agent, or Firm* — Finnegan, Henderson, Farabow, Garrett & Dunner, LLP

(57) ABSTRACT

A power system is provided for a mobile machine. The power system may have a traction motor configured to propel the mobile machine during a driving operation and to generate electricity during a braking operation. The power system may also have an aluminum-air battery connected to the traction motor. The power system may further have a circuit fluidly connected to the aluminum-air battery and configured to circulate electrolyte and aluminum hydroxide particles produced by the aluminum-air battery. The power system may also have a crystallizer connected to the circuit and configured to crystallize and separate the aluminum hydroxide particles from the electrolyte. The power system may also have a heating chamber configured to heat the aluminum hydroxide particles and produce aluminum oxide separated from the electrolyte, wherein the heating chamber is powered by electricity generated by the traction motor during the braking operation.

15 Claims, 3 Drawing Sheets

(51) Int. Cl.
*H01M 12/08* (2006.01)
*H01M 4/46* (2006.01)
*B60L 11/18* (2006.01)

(52) U.S. Cl.
CPC ......... *H01M 4/463* (2013.01); *H01M 2220/20* (2013.01); *H01M 2250/20* (2013.01); *Y02T 90/32* (2013.01)

(56) References Cited

U.S. PATENT DOCUMENTS

| | | | |
|---|---|---|---|
| 4,978,509 | A | 12/1990 | Maimoni |
| 4,994,332 | A * | 2/1991 | Coin ............... B01D 29/33 210/149 |
| 5,121,044 | A | 6/1992 | Goldman et al. |
| 5,879,831 | A | 3/1999 | Ovshinsky et al. |
| 5,952,117 | A | 9/1999 | Colborn et al. |
| 6,384,569 | B1 | 5/2002 | Pintz et al. |
| 6,636,016 | B2 | 10/2003 | Tanka et al. |
| 6,998,184 | B2 | 2/2006 | Venkatesan et al. |
| 2013/0054080 | A1 | 2/2013 | Jacobson |

OTHER PUBLICATIONS

Addie, A.N. and Concannon, B.T., "Energy Requirements of the Rail Mode," *Journal of Engineering for Industry*, vol. 100, Nov. 1978, 476-482. Published Nov. 1, 1978, 7 pages.

Maimoni, Arturo, "Aluminum-Air Battery Crystallizer," Published Jan. 1987, 24 pages.

* cited by examiner

MOBILE ALUMINUM-AIR BATTERY POWER SYSTEM

TECHNICAL FIELD

The present disclosure relates generally to an aluminum-air battery power system, and more particularly, to an aluminum-air battery power system for powering a mobile machine.

BACKGROUND

Aluminum-air batteries have the potential to produce power that operates mobile machines (e.g., automobiles). Aluminum-air batteries consume aluminum anodes as fuel and have an energy density that surpasses conventional battery technologies (e.g., lithium-ion batteries). When used to power a mobile machine, aluminum air batteries have a travel range comparable to vehicles powered by an internal combustion engine. However, aluminum-air batteries are not electrically rechargeable like many conventional batteries. Instead, aluminum-air batteries must be mechanically recharged by replacing the aluminum anode. The consumed aluminum anodes are converted into aluminum hydroxide by the electrochemical reaction taking place in the aluminum-air batteries. The aluminum hydroxide produced may be collected and recycled back into aluminum. The recycling process involves heating (i.e., calcining) the aluminum hydroxide to form aluminum oxide, mixing the aluminum oxide with various salts, and regenerating the aluminum oxide to aluminum by electrolysis.

Recycling the aluminum hydroxide can reduce the overall cost of aluminum-air batteries. However, the heating step (e.g., calcining) of the recycling process requires a significant amount of energy. In addition, even though aluminum-air batteries have an energy density greater than that of convention battery technology, limiting the footprint of the aluminum-air batteries and corresponding system is a challenge for mobile machine applications where space is limited.

One article analyzing the use of aluminum-air batteries in electric vehicles was written by Shaohua Yang & Harold Knickle, and is titled *Design and Analysis of Aluminum/Air Battery System for Electric Vehicles*. The article was published in 2002 by the Journal of Power Sources, at pages 162-173. The article discusses the fuel cost and efficiency of aluminum-air batteries, as well as the recycling process. The article compares aluminum-air batteries to lead/acid batteries and nickel-metal hybride battery. Although the article breaks down the cost, efficiency, and recycling process for aluminum-air batteries, it does not put forth solutions for reducing the high energy needs for aluminum hydroxide recycling or reducing the footprint of the aluminum-air battery system.

The aluminum-air battery power system of the present disclosure is directed to overcoming one or more of the problems set forth above.

SUMMARY

In one aspect, the present disclosure is directed to a power system for a mobile machine. The power system may include a traction motor configured to propel the mobile machine during a driving operation and to generate electricity during a braking operation. The power system may also include an aluminum-air battery connected to the traction motor. The power system may further include a circuit fluidly connected to the aluminum-air battery and configured to circulate electrolyte and aluminum hydroxide particles produced by the aluminum-air battery. The power system may also include a crystallizer connected to the circuit and configured to crystallize and separate the aluminum hydroxide particles from the electrolyte. The power system may further include a heating chamber configured to heat the aluminum hydroxide particles and produce aluminum oxide separated from the electrolyte, wherein the heating chamber is powered by electricity generated by the traction motor during the braking operation.

In another aspect, the present disclosure is directed to a method of operating an aluminum-air battery power system for a mobile machine. The method may include circulating an electrolyte through an aluminum-air battery to remove aluminum hydroxide particles produced by the aluminum-air battery. The method may further include separating at least a portion of the aluminum hydroxide particles from the electrolyte. The method may also include braking the mobile machine to generate electricity and converting the electricity to heat. The method may further include warming the aluminum hydroxide particles separated from the electrolyte with the heat to produce aluminum oxide.

In another aspect, the present disclosure is directed to a mobile machine. The mobile machine may include a frame, wheels configured to support the frame, and a traction motor configured to drive the wheels. The mobile machine may also include a plurality of aluminum-air batteries mounted to the frame and connected to the traction motor. The mobile machine may further include a circuit fluidly connected to the aluminum-air battery and configured to circulate electrolyte and aluminum hydroxide particles produced by the aluminum-air battery. The mobile machine may also include a crystallizer connected to the circuit and mounted to the frame, and configured to crystallize and separate aluminum hydroxide particles from the electrolyte. The mobile machine may also include a resistive heating coil configured to heat the aluminum hydroxide particles separated by the crystallizer to produce aluminum oxide particles, wherein the heating is powered by the electricity from the traction motor during a braking operation.

DETAILED DESCRIPTION

Figure 1:
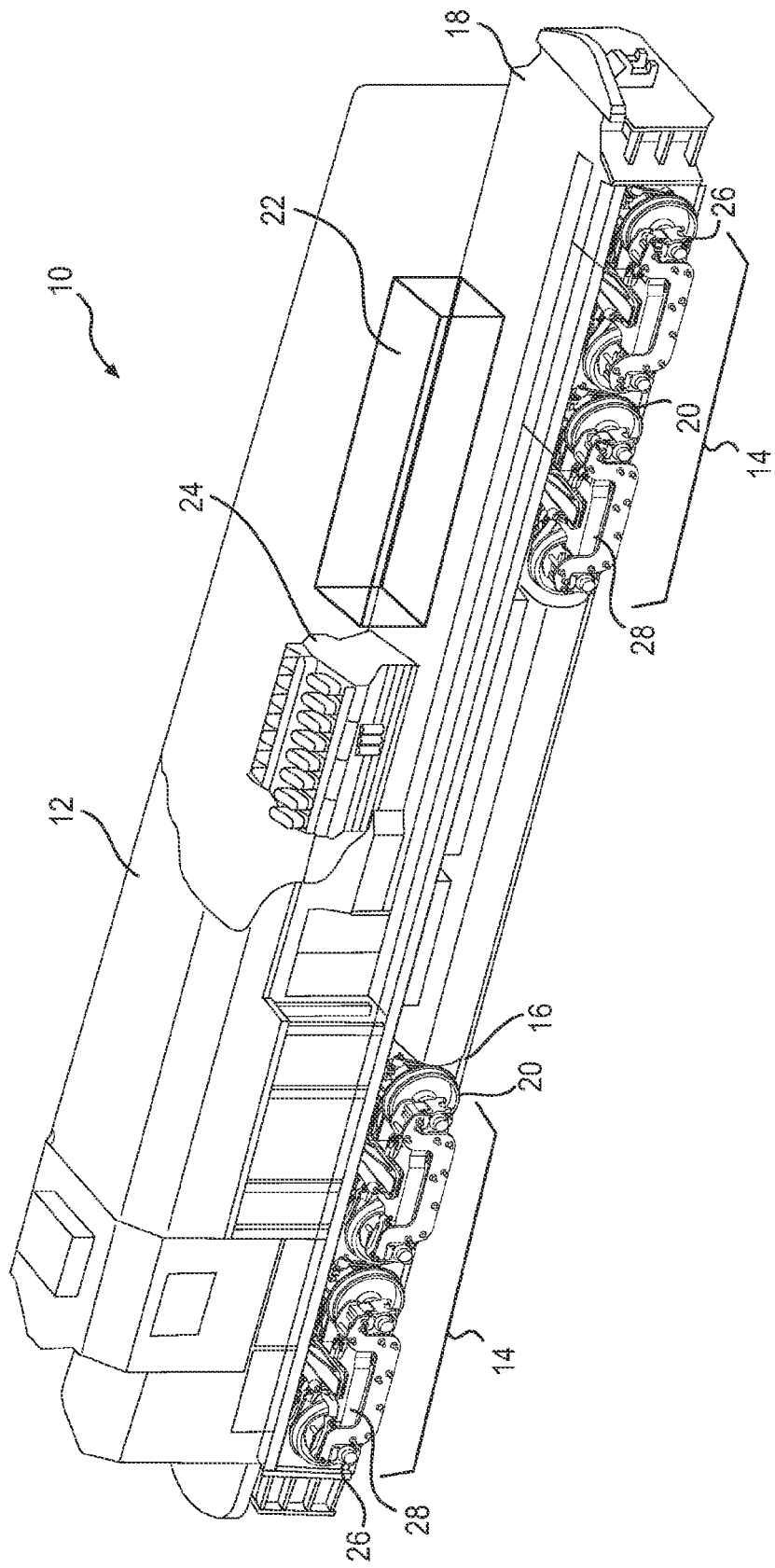
FIG. 1 is a pictorial illustration of an exemplary disclosed mobile machine.

FIG. 1 illustrates a mobile machine, specifically a locomotive 10. The locomotive may include a car body 12 supported at opposing ends by a plurality of trucks 14 (e.g., two trucks 14). Each truck 14 may be configured to engage a track 16 and support a base platform 18 of car body 12. Any number of power systems may be mounted to base platform 18 and configured to drive a plurality of wheels 20 included within each truck 14. In the exemplary embodiment shown in FIG. 1, locomotive 10 may include an aluminum-air battery power system 22 and an engine 24. Power system 22 may be the primary system, and engine 24 may function as a backup or secondary power system. Engine 24 may be any type of engine such as, for example, a diesel engine, a gasoline engine, or a gaseous fuel-powered engine. Engine 24 may be coupled to an electrical generator that is configured to convert mechanical power produced by engine 24 to electrical power.

Each truck 14 may have two or more axles 26 that are configured to support wheels 20 at opposing ends thereof, such that wheels 20 and axles 26 rotate together. A traction motor 28, for example an electric motor driven with power generated by power system 22 (or engine 24), may be connected to a frame of truck 14 and configured to drive wheels 20 via axles 26. Each traction motor 28 may be located between each pair of wheels 20 and partially supported by axle 26, upon which the pair of wheels 20 is mounted.

Traction motors 28 may operate in a motor mode, during which the traction motors receive electrical power from power system 22 (or engine 24) to propel locomotive 10, or in a generator mode, during which the traction motors 28 generate electrical power from a braking operation (e.g., from dynamic braking). Dynamic braking may provide a smoother deceleration for locomotive 10 on a downhill slope than would be provided by mechanical or pneumatic braking using disk or drum brakes.

Figure 2:
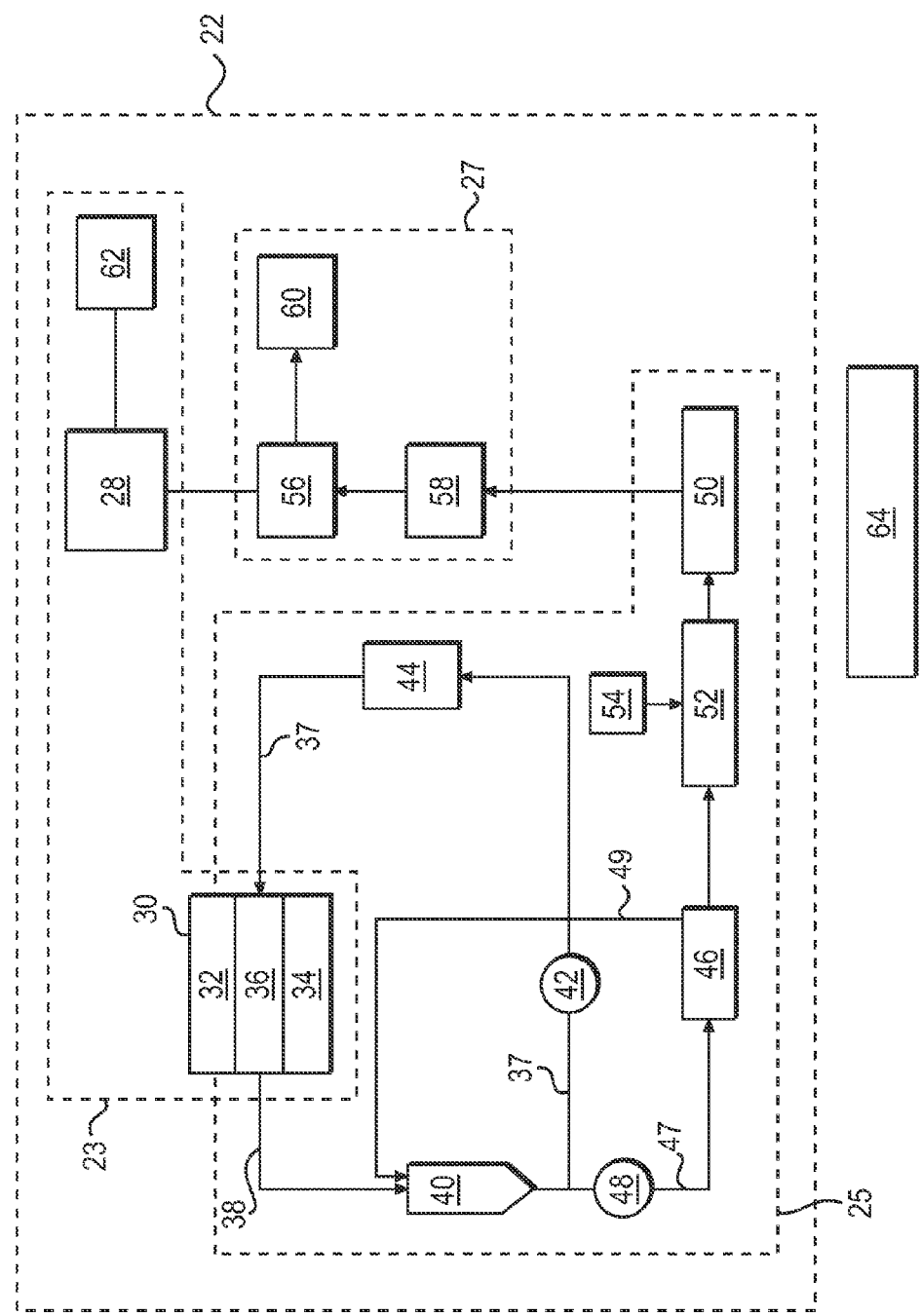
FIG. 2 is a diagrammatic illustration of an exemplary disclosed power system for the mobile machine of FIG. 1.

FIG. 2 illustrates a schematic diagram of aluminum-air battery power system 22 that may be used in conjunction with locomotive 10. Power system 22 may include a power circuit 23, an electrolyte circuit 25, and a recycling circuit 27. Power circuit 23 may include an aluminum-air battery 30, traction motors 28, and a grid of resistors 62. In the motor mode, aluminum-air battery 30 may drive traction motors 28. In the generator mode, the electricity produced by traction motors 28 may be dissipated as heat by resistors 62 and/or used by recycling circuit 27. Resistors 62 may be configured such that some or all of the electrical power generated by traction motor 28 (i.e., while operating in generator mode) may be routed to resistors 62 and dissipated as heat. Electrolyte circuit 25 may be configured to remove waste product from aluminum-air battery 30. Recycling circuit 27 may interface with power circuit 23 and electrolyte circuit 25 to take the waste product from electrolyte circuit 25 and begin a recycling process using electricity from power circuit 23.

Aluminum-air battery 30 of power circuit 23 may include an aluminum anode 32, an air cathode 34, and an electrolyte 36 located in between aluminum anode 32 and air cathode 34. Aluminum anode 32 may be formed of pure aluminum or an aluminum alloy. For example, aluminum anode 32 may be an aluminum alloy formed primarily of aluminum and combined with one or more other metals such as tin, strontium, gallium, and the like.

Aluminum-air battery 30 may include one or more aluminum-air batteries. A plurality of aluminum-air batteries may form an aluminum-air battery stack or a plurality of stacks. Aluminum-air battery 30 produces electricity from the reaction of oxygen in the air with aluminum. As is known to one skilled in the art, an aluminum-air battery (e.g., aluminum-air battery 30) is not electrically rechargeable, because once the aluminum anode is consumed by the reaction with oxygen at the cathode, the battery will no longer produce electricity. However, it is possible to mechanically recharge the battery by introducing a new aluminum anode into the battery by, for example, gravity feed.

Aluminum-air battery 30 may be configured to circulate electrolyte 36, such that aluminum hydroxide particles that are produced as a result of the reaction may be carried out of aluminum-air battery 30. By circulating electrolyte 36 through battery 30, removing the aluminum hydroxide particle, and installing a new aluminum anode 32, the performance of aluminum-air battery 30 may be substantially maintained.

Electrolyte circuit 25 may be configured to circulate electrolyte 36 through aluminum-air battery 30 and back to an electrolyte storage chamber 40. A heat exchanger 44 may be associated with electrolyte circuit 25, and configured to regulate a temperature of electrolyte 36. A first pump 42 may be configured to draw electrolyte 36 from electrolyte storage chamber 40 and pump it through heat exchanger 44 to aluminum-air battery 30 via a passage 37. Electrolyte circuit 25 may further include a passage 38 configured to direct electrolyte 36 from aluminum-air battery 30 back to electrolyte storage chamber 40.

Electrolyte circuit 25 may also include a crystallizer 46 in fluid communication with electrolyte storage chamber 40. Between electrolyte storage chamber 40 and crystallizer 46 may be a second pump 48 configured to draw electrolyte 36 and pump it to crystallizer 46 via a passage 47. Crystallizer 46 may be configured to separate at least a portion of the aluminum hydroxide particles from electrolyte 36. Crystallizer 46 may be, for example, a hydrocyclone, which may be configured to separate the aluminum hydroxide particles based on the ratio of their centripetal force to fluid resistance. The larger aluminum hydroxide particles may be separated, while the finer aluminum hydroxide particles may be agglomerated to form larger aluminum hydroxide particles, which are then separated. A portion of the finer aluminum hydroxide particles not separated may remain in electrolyte 36 and pass through crystallizer 46 to return to electrolyte storage chamber 40 via passage 49, as shown in FIG. 2.

Electrolyte circuit 25 may also include an aluminum hydroxide storage chamber 50. The aluminum hydroxide particles separated from electrolyte 36 by crystallizer 46 may be transported to aluminum hydroxide storage chamber 50. The aluminum hydroxide particles may be transported via a first conveyor 52 to aluminum hydroxide storage chamber 50. Power system 22 may also include a supply of water 54 configured to dispense water onto first conveyor 52, in a direction opposite the direction of particle movement. The water may collect residual hydroxide salts (e.g., Potassium Hydroxide, Sodium Hydroxide, etc.) deposited on the aluminum hydroxide particles, and return the hydroxide salts back to electrolyte 36. Thus, the level of hydroxide salts in electrolyte 36 can be maintained to be substantially uniform so that a high electrolyte electrical conductivity can be maintained. Maintaining a high electrolyte electrical conductivity can help to maximize a voltage potential of aluminum-air battery 30.

Recycling circuit 27 may include a heating chamber 56. Heating chamber 56 may include, for example, one or more resistive heating elements. Heating chamber 56 may be connected to traction motor 28, such that the electricity produced by traction motor 28 during the generator mode operation may be used to power the resistive heating element. Heating chamber 56 may be configured to receive aluminum hydroxide particles from aluminum hydroxide storage chamber 50 via a second conveyor 58, and calcine the aluminum hydroxide particles by heating. The calcined aluminum hydroxide particles may form aluminum oxide particles. To calcine the aluminum hydroxide particles, heating chamber 56 may raise the temperature of the aluminum hydroxide particles up to and greater than, for example, about 1000° C.

During the calcining process, water may evaporate from the aluminum hydroxide particles. The water vapor may be vented, or collected and condensed. The condensed water may be recycled back to, for example, supply 54.

Recycling circuit 27 may also include an aluminum oxide storage chamber 60 configured to receive the aluminum oxide particles formed in heating chamber 56. Aluminum hydroxide storage chamber 50 and aluminum oxide storage chamber 60 may be configured for easy particle unloading from locomotive 10. For example, both storage chambers 50,60 may be configured to be modular chambers that are removable and easily replaceable in locomotive 10. Alternatively, both storage chambers may be configured to unload the particles by dumping.

Power system 22 may also include a controller 64. Controller 64 may be in communication with aluminum-air battery 30, electrolyte storage chamber 40, first pump 42, heat exchanger 44, crystallizer 46, second pump 48, aluminum hydroxide storage chamber 50, first conveyor 52, supply 54, heating chamber 56, second conveyor 58, aluminum oxide storage chamber 60, or resistors 62. Controller 64 may be a single microprocessor or multiple microprocessors that includes a mechanism for controlling an operation of power system 22. Numerous commercially available microprocessors can be configured to perform the functions of controller 64. It should be appreciated that controller 64 could readily be embodied in a general locomotive microprocessor capable of controlling numerous machine functions. Controller 64 may include a memory, a secondary storage device, a processor, and any other components for running an application. Various other circuits may be associated with controller 64 such as power supply circuitry, signal conditioning circuitry, solenoid driver circuitry, and other types of circuitry.

Figure 3:
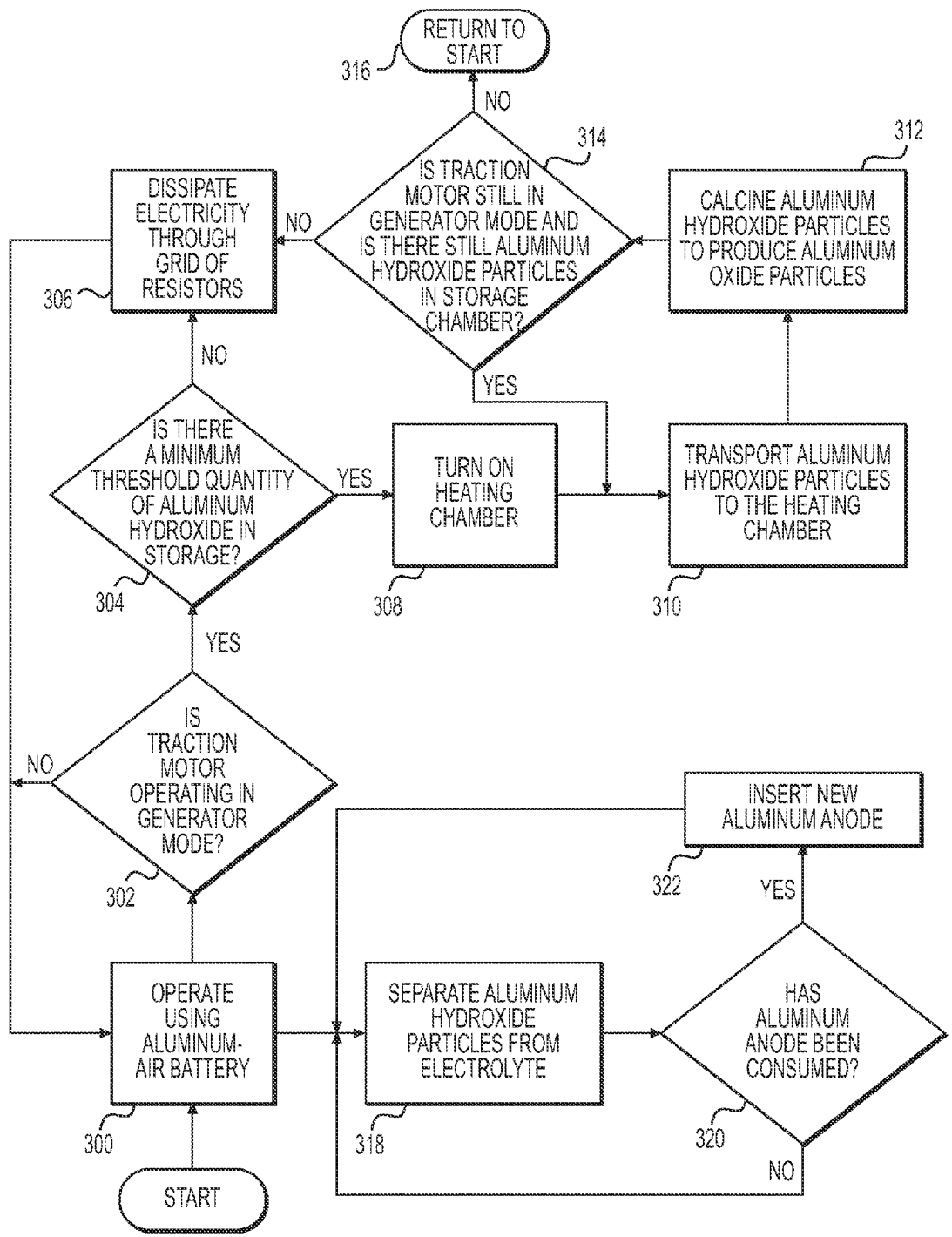
FIG. 3 is a flow chart illustrating an exemplary disclosed method of operating the power system of FIG. 2.

FIG. 3 illustrates an exemplary power system process performed by controller 64. FIG. 3 will be discussed in more detail in the following section to better illustrate the disclosed concepts.

INDUSTRIAL APPLICABILITY

The disclosed power system may be applicable to any mobile machine that performs dynamic braking. The disclosed power system may enable use of aluminum-air batteries as a power source and use of the power generated during dynamic breaking for calcining of aluminum hydroxide produced by the batteries. Additional advantages of the power system may include increased energy efficiency, reduced recycling cost, and reduced system footprint. Operation of the power system will now be explained.

Locomotive 10 may operate and draw power from aluminum-air battery 30, at step 300. During operation of locomotive 10, traction motors 28 may operate in a motor mode and be powered by aluminum-air battery 30, or in a generator mode when traction motors 28 generate electrical power by dynamic braking. At step 302, controller 64 may determine if traction motors 28 are operating in the generator mode. If traction motors 28 are not operating in the generator mode (Step 302: No), but rather operating in motor mode, then controller 64 may return to step 300.

If traction motors 28 are operating in generator mode (Step 302: Yes), then controller 64 may proceed to step 304. At step 304, controller 64 may determine if there are aluminum hydroxide particles in aluminum hydroxide storage chamber 50. For example, controller can be configured to detect a level in aluminum hydroxide storage chamber 50 and determine whether the level at least meets a minimum threshold quantity. The minimum threshold quantity may be equal to the minimum quantity preferred for calcining based on the scale of power system 22. If there is not the minimum quantity of aluminum hydroxide particles in aluminum hydroxide storage chamber 50 (Step 304: No), then controller 64 may proceed to step 306. At step 306, the electricity generated by traction motor 28 may be directed to resistors 62, where it can be dissipated as heat.

If there is a sufficient quantity of aluminum hydroxide particles in aluminum hydroxide storage chamber 50 (Step 304: Yes), then controller 64 may proceed to step 308. At step 308, controller 64 may turn on heating chamber 56. Turning on heating chamber 56 may include directing the electricity generated by traction motors 28 to heating chamber 56 and raising the temperature of heating chamber 56 to, for example, about 1000° C. From step 308, controller 64 may proceed to step 310, where aluminum hydroxide particles can be transported via second conveyor 58 to heating chamber 56 from aluminum hydroxide storage chamber 50. From step 310, controller may proceed to step 312, where aluminum hydroxide particles may be heated within heating chamber 56, causing calcination and producing aluminum oxide particles. The aluminum oxide particles may be removed from heating chamber 56 and moved to aluminum oxide storage chamber 60. During the calcining, the water vapor may be vented, or collected, condensed, and recycled.

It is contemplated that transporting of aluminum hydroxide particles to heating chamber 56, calcination, and transporting aluminum oxide to aluminum oxide storage chamber 60 can be a continuous operation. In one embodiment, second conveyor 58 can be configured to extend from aluminum hydroxide storage chamber 50 to aluminum oxide storage chamber 60 and, along the route, can pass through heating chamber 56. In this embodiment, the speed of second conveyor 58 can be configured such that the aluminum hydroxide particles are within heating chamber 56 for a sufficient period to complete calcination.

From step 312, controller 64 may proceed to step 314, where it can be determined whether traction motors 28 are still operating in the generator mode and if there is still a minimum quantity of aluminum hydroxide particles in aluminum hydroxide storage chamber 50 for calcining. If both conditions are satisfied (Step 314: Yes), controller 64 may return to step 310 and continue calcining aluminum hydroxide particles. If traction motors 28 are no longer operating in generator mode (Step 314: No.), then controller 64 may proceed to step 316, at which controller 64 can return to the start. If traction motor 28 is still operating in generator mode, but there is no longer the minimum quantity of aluminum hydroxide particles (Step 314: No), then controller 64 can proceed to step 306, enabling the electricity generated by traction motor 28 to be diverted to resistors 62 and dissipated as heat. It is contemplated that, if traction motor 28 is generating electricity in excess of what is required to heat heating chamber 56 to the target temperature for calcining, then the excess electricity can be diverted in parallel to resistors 62.

Referring back to step 300, while locomotive 10 is operating and drawing power from aluminum-air battery 30, controller 64 can also proceed to step 318. At step 318, the aluminum hydroxide particles formed by the electrochemical reactions with aluminum-air battery 30 may be separated from electrolyte 36 by crystallizer 46. This may take place continuously while locomotive 10 is drawing power from aluminum-air battery 30. While this is occurring, controller 64 may proceed to step 320 where it can be determined if the aluminum anode 32 of aluminum-air battery 30 has been consumed by the electrochemical reactions. Controller 64 may be configured to determine whether aluminum anode 32 is consumed based on the electrical output of aluminum-air battery 30. If aluminum anode 32 has not been consumed (Step 320: No), then controller 64 may return to step 318. For example, if the output voltage is less than a threshold amount, then the anode may be considered consumed. If aluminum anode 32 has been consumed (Step 320: Yes), then controller 64 may proceed to step 322. At step 322, a new aluminum anode 32 may be inserted into aluminum-air battery 30. Power system 22 may be configured such that insertion of a new aluminum anode may be a manual or automatic operation. For example, a new aluminum anode 32 may be automatically inserted by a dispenser, or actuator, or manually dropped in from a storage rack.

From step 322, controller 64 may return to step 318. Whether a replacement aluminum anode 32 will need to be installed during a trip may depend on the amount of electricity drawn from aluminum-air battery 30 and the duration of the trip. For example, for a short trip, aluminum anode 32 may not be consumed and, thus, no replacement aluminum anode 32 will need to be installed. In contrast, on a long trip, multiply aluminum anodes 32 may be consumed, calling for repeated replacement.

The amount of time traction motor 28 will be operating in the generator mode will depend substantially on the route of travel of locomotive 10. For example, a hilly route will likely bring about more dynamic braking (i.e., generator mode), whereas a substantially flat route will bring about less dynamic braking. Therefore, it is contemplated that, along certain routes (e.g., a hilly route), locomotive 10 may be able to calcine substantially all of the aluminum hydroxide particles into aluminum oxide. In contrast, along other routes (e.g., a flat route), locomotive 10 may not be able to calcine all of the aluminum hydroxide particles into aluminum oxide. As a result, locomotive 10 may return to its terminal or depot with a quantity of aluminum hydroxide particles as well as aluminum oxide particles. At the depot, both the aluminum hydroxide particles and the aluminum oxide particles may be unloaded and delivered for aluminum recycling. The aluminum recycling may take place onsite at the depot, or the aluminum hydroxide and oxide may be shipped to a local aluminum recycling facility. The cost of recycling the aluminum oxide into aluminum may be less than that of the aluminum hydroxide, because the calcination has already been completed thereby eliminating this cost (e.g., processing, time, energy). Therefore, by calcining some or all of the aluminum hydroxide into aluminum oxide using the electricity generated by dynamic braking, the recycling cost for the locomotive operator may be reduced. This can be particularly advantageous because, often, the electricity being generated from dynamic braking is wasted energy dissipated as heat. While locomotive 10 is at the terminal or depot, the supply of aluminum anodes 32 may also be replenished. These aluminum anodes 32 may be manufactured by recycled aluminum hydroxide particles and aluminum oxide particles.

As described herein, it is beneficial to calcine the aluminum hydroxide particles onboard locomotive 10 because of the saving in recycling cost, but it is also beneficial because of the reduction in the footprint of power system 22. Aluminum oxide has a specific gravity about four times the specific gravity of aluminum hydroxide. Therefore, by calcining the aluminum hydroxide, the storage volume (e.g., aluminum hydroxide storage chamber 50 and aluminum oxide storage chamber 60) within locomotive 10 may be reduced. Reducing the volume of storage chambers 50, 60 can create additional room for other components (e.g., aluminum-air batteries 30, replacement aluminum anodes 32, etc.), which may increase the range of locomotive 10.

The volume of aluminum hydroxide storage chamber 50 and aluminum oxide storage chamber 60 can be sized based on a variety of factors. For example, the number of aluminum-air batteries 30 within locomotive 10, the average length of routes for locomotive 10, the geography of the routes (e.g., hilly or flat), may be some of these factors. Based on these factors and more, aluminum hydroxide storage chamber 50 and aluminum oxide storage chamber 60 may be sized such that there is always sufficient volume to hold the aluminum hydroxide particles formed and the aluminum oxide produced at any point along a particular route.

It will be apparent to those skilled in the art that various modifications and variations can be made to the disclosed power system. Other embodiments will be apparent to those skilled in the art from consideration of the specification and practice of the disclosed power system. It is intended that the specification and examples be considered as exemplary only, with a true scope being indicated by the following claims and their equivalents.

What is claimed is:

1. A power system for a mobile machine, comprising:
   a traction motor configured to propel the mobile machine during a driving operation and to generate electricity during a braking operation;
   an aluminum-air battery connected to the traction motor;
   a circuit fluidly connected to the aluminum-air battery and configured to circulate electrolyte and aluminum hydroxide particles produced by the aluminum-air battery;
   a crystallizer connected to the circuit and configured to crystallize and separate the aluminum hydroxide particles from the electrolyte; and
   a heating chamber configured to heat the aluminum hydroxide particles and produce aluminum oxide separated from the electrolyte, wherein the heating chamber is powered by electricity generated by the traction motor during the braking operation.

2. The power system of claim 1, further including:
   an electrolyte storage chamber connected to the circuit and configured to contain electrolyte and aluminum hydroxide particles;
   an aluminum hydroxide storage chamber configured to receive aluminum hydroxide particles separated by the crystallizer; and
   an aluminum oxide storage chamber configured to receive aluminum oxide from the heating chamber.

3. The power system of claim 2, further including a first conveyor configured to transport aluminum hydroxide particles from the aluminum hydroxide storage chamber to the heating chamber.

4. The power system of claim 3, further including a water supply configured to dispense water onto the first conveyor in a direction opposite the direction of the aluminum hydroxide particle movement.

5. The power system of claim 4, wherein hydroxide salts collected by the water are recycled back to the electrolyte to maintain a substantially uniform electrical conductivity of the electrolyte.

6. The power system of claim 2, further including a conveyor configured to transport aluminum hydroxide particles from the aluminum hydroxide storage chamber through the heating chamber to the aluminum oxide storage chamber.

7. A method of operating an aluminum-air battery power system for a mobile machine, comprising:
- circulating an electrolyte through an aluminum-air battery to remove aluminum hydroxide particles produced by the aluminum-air battery;
- separating at least a portion of the aluminum hydroxide particles from the electrolyte;
- braking the mobile machine to generate electricity;
- converting the electricity to heat; and
- warming the aluminum hydroxide particles separated from the electrolyte with the heat to produce aluminum oxide.

8. The method of claim 7, further including dispensing water on the aluminum hydroxide particles separated from the electrolyte to collect hydroxide salts attached to the aluminum hydroxide particles.

9. The method of claim 8, further including returning the hydroxide salts to the electrolyte to maintain a substantially uniform electrical conductivity of the electrolyte.

10. The method of claim 7, further including transporting the aluminum hydroxide particles while warming the aluminum hydroxide particles, wherein a speed of the transporting is controlled such that a duration of time the aluminum hydroxide particles are warming corresponds to a time needed for calcining.

11. The method of claim 7, further including feeding in a new aluminum anode into the aluminum-air battery to replace an existing aluminum anode after such existing aluminum anode is consumed.

12. The method of claim 7, further including verifying a quantity of the aluminum hydroxide particles has been separated for from the electrolyte before converting the electricity to the heat and initiating the warming of the aluminum hydroxide particles.

13. The method of claim 12, further including dissipating the electricity through a grid of resistors when the quantity of the aluminum hydroxide particles separated from the electrolyte is less than a minimum threshold quantity.

14. The method of claim 7, further including powering the mobile machine using electricity from the aluminum-air battery.

15. A mobile machine, comprising:
- a frame;
- wheels configured to support the frame;
- a traction motor configured to drive the wheels;
- a plurality of aluminum-air batteries mounted to the frame and connected to the traction motor;
- a circuit fluidly connected to the aluminum-air battery and configured to circulate electrolyte and aluminum hydroxide particles produced by the aluminum-air battery;
- a crystallizer connected to the circuit and mounted to the frame, and configured to crystallize and separate aluminum hydroxide particles from the electrolyte; and
- a resistive heating coil configured to heat the aluminum hydroxide particles separated by the crystallizer to produce aluminum oxide particles, wherein the heating is powered by the electricity from the traction motor during a braking operation.

* * * * *